US012726147B2

(12) United States Patent
Fukuda et al.

(10) Patent No.: US 12,726,147 B2
(45) Date of Patent: Sep. 1, 2026

(54) MOTOR DRIVER

(71) Applicant: Nuvoton Technology Corporation Japan, Kyoto (JP)

(72) Inventors: Daisuke Fukuda, Kyoto (JP); Takuya Ishii, Osaka (JP); Shinichi Kuroshima, Kyoto (JP); Noriaki Emura, Osaka (JP)

(73) Assignee: Nuvoton Technology Corporation Japan, Kyoto (JP)

( * ) Notice: Subject to any disclaimer, the term of this patent is extended or adjusted under 35 U.S.C. 154(b) by 199 days.

(21) Appl. No.: 18/807,297

(22) Filed: Aug. 16, 2024

(65) Prior Publication Data

US 2024/0405706 A1 Dec. 5, 2024

Related U.S. Application Data

(63) Continuation of application No. PCT/JP2023/010992, filed on Mar. 20, 2023.

(30) Foreign Application Priority Data

Mar. 25, 2022 (JP) ................................ 2022-050627

(51) Int. Cl.
*H02P 23/14* (2006.01)
*H02P 27/08* (2006.01)

(52) U.S. Cl.
CPC .................................. *H02P 23/14* (2013.01)

(58) Field of Classification Search
CPC ................................ H02P 23/14; H02P 27/08
See application file for complete search history.

(56) References Cited

U.S. PATENT DOCUMENTS 11,996,795 B2 * 5/2024 Tan ......................... H02P 1/465
2011/0260669 A1 * 10/2011 Nakahata ................. H02P 7/29 318/503
2016/0099560 A1 * 4/2016 Yamada ................ H02H 5/044 361/103
2022/0345056 A1 * 10/2022 Aoki ........................ H02P 6/08

FOREIGN PATENT DOCUMENTS

JP 2003033081 A * 1/2003
JP 2007-006563 A 1/2007

OTHER PUBLICATIONS

International Search Report dated May 30, 2023 issued in International Patent Application No. PCT/JP2023/010992, with English machine translation.

* cited by examiner

*Primary Examiner* — Thai T Dinh
(74) *Attorney, Agent, or Firm* — Rimon P.C.

(57) ABSTRACT

A motor driver includes: a current detector that outputs a current signal corresponding to a motor current; a current comparison circuit that compares the current signal with a reference waveform signal; and a PWM circuit that outputs a first drive signal and a second drive signal. The first drive signal includes a first pulse that starts synchronously with a start of a reference pulse signal and ends after the pulse duration time has elapsed from a beginning of the reference pulse signal and when an absolute value of the current signal exceeds an absolute value of the reference waveform signal, and the second drive signal includes a second pulse that starts after the first pulse ends when the absolute value of the current signal exceeds the absolute value of the reference waveform signal within the pulse duration time.

5 Claims, 12 Drawing Sheets

10
Second series switch circuit
First series switch circuit
First PWM circuit
Second PWM circuit
PWM circuit
Current comparison circuit
Reference waveform generation circuit
Delay
Delay
Vcc
Vcc
DIR
Vr1
Vr2
Vs
P0
P1
P2
C1
C2
V1
V2
V3
V4
X1
X2
Q61
Q63
Q71
Q73

MOTOR DRIVER

CROSS REFERENCE TO RELATED APPLICATIONS

This is a continuation application of PCT International Application No. PCT/JP2023/010992 filed on Mar. 20, 2023, designating the United States of America, which is based on and claims priority of Japanese Patent Application No. 2022-050627 filed on Mar. 25, 2022. The entire disclosures of the above-identified applications, including the specifications, drawings and claims are incorporated herein by reference in their entirety.

FIELD

The present disclosure relates to a motor driver.

BACKGROUND

Low noise and low vibration are required in motor drivers. Examples of the motor drivers capable of driving motors with low noise and low vibration include a motor driver disclosed in Patent Literature (PTL) 1. The motor driver disclosed in PTL 1 is intended to achieve low noise and low vibration by detecting, at a resistor, a current that flows through a motor coil in response to a switching operation of a switch element, and performing pulse width modulation (PWM) control on such current to cause the peak value of the voltage of the detected current to follow the reference voltage. Here, the reference voltage is a voltage to which the target value of the current flowing through the motor coil is set.

CITATION LIST

Patent Literature

PTL 1: Japanese Unexamined Patent Application Publication No. 2007-6563

SUMMARY

Technical Problem

The foregoing related art requires a period during which a surge current that occurs at the time of truing ON the switch element is ignored, that is, a mask period during which PWM control is stopped. The mask period needs to be set to the minimum ON period, which is a period sufficiently long to cover the period in which a surge current can occur. For this reason, the mask period cannot be reduced to be a predetermined time or shorter. By setting such a mask period, the current can exceed the target value in the vicinity of the zero-crossing point at which the current flowing through the motor coil is crossing zero. To cope with this, PTL 1 discloses mode switching of the switching operation in the vicinity of the zero-crossing point. However, the minimum ON period needs to be set differently depending on the properties of the switch elements, and is set to be sufficiently long in consideration of the general versatility of a switch element driver circuit. As such, a problem is prominent in that the current waveform deviates from the target waveform in the vicinity of the zero-crossing point.

The present disclosure aims to solve the foregoing problem, and provides a motor driver capable of causing the current waveform in the vicinity of the zero-crossing point to accurately follow the target waveform.

Solution to Problem

In view of the above, a motor driver according to the present disclosure is a motor driver that drives a motor, the motor driver including: a first series switch circuit that includes a first high-side switch element and a first low-side switch element; a second series switch circuit that includes a second high-side switch element and a second low-side switch element, and is connected in parallel to the first series switch circuit; a reference pulse generation circuit that generates, in a predetermined cycle, a reference pulse signal whose pulse duration time is greater than zero; a current detector that outputs a current signal corresponding to a motor current that is a current flowing through the motor; a reference waveform generation circuit that generates a reference waveform signal corresponding to a control target value of the motor current; a current comparison circuit that compares the current signal with the reference waveform signal to generate a comparison signal; and a pulse width modulation (PWM) circuit that outputs a first drive signal and a second drive signal in response to receiving the reference pulse signal, the reference waveform signal, and the comparison signal, wherein the motor is connected between a first connection point and a second connection point, the first connection point being a point connecting the first high-side switch element and the first low-side switch element, the second connection point being a point connecting the second high-side switch element and the second low-side switch element, the first drive signal includes a first pulse that starts synchronously with a start of the reference pulse signal and ends at a timing which is after the pulse duration time has elapsed from a beginning of the reference pulse signal and at which an absolute value of the current signal exceeds an absolute value of the reference waveform signal, the second drive signal includes a second pulse that starts after the first pulse ends and lasts at least during a period until the absolute value of the current signal falls below the absolute value of the reference waveform signal, when the absolute value of the current signal exceeds the absolute value of the reference waveform signal within the pulse duration time, and the PWM circuit: outputs the first drive signal to the first series switch circuit and the second drive signal to the second series switch circuit in a first period during which the motor current flows mainly from the first connection point to the second connection point; and outputs the second drive signal to the first series switch circuit and the first drive signal to the second series switch circuit in a second period during which the motor current flows mainly from the second connection point to the first connection point.

Advantageous Effects

According to the present disclosure, it is possible to provide a motor driver capable of causing the current waveform in the vicinity of the zero-crossing point to accurately follow the target waveform.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Hereinafter, certain exemplary embodiments are described in greater detail with reference to the accompanying Drawings. Each of the exemplary embodiments described below shows a general or specific example. The numerical values, shapes, materials, elements, the arrangement and connection of the elements, etc. shown in the following exemplary embodiments are mere examples, and therefore do not limit the scope of the present disclosure.

The drawings are schematic views, and are not always strictly drawn. Thus, for example, the drawings are not always drawn to scale. Also, substantially the same elements are given the same reference marks throughout the drawings, and overlapping description are omitted or simplified.

Embodiment 1

Figure 1A:
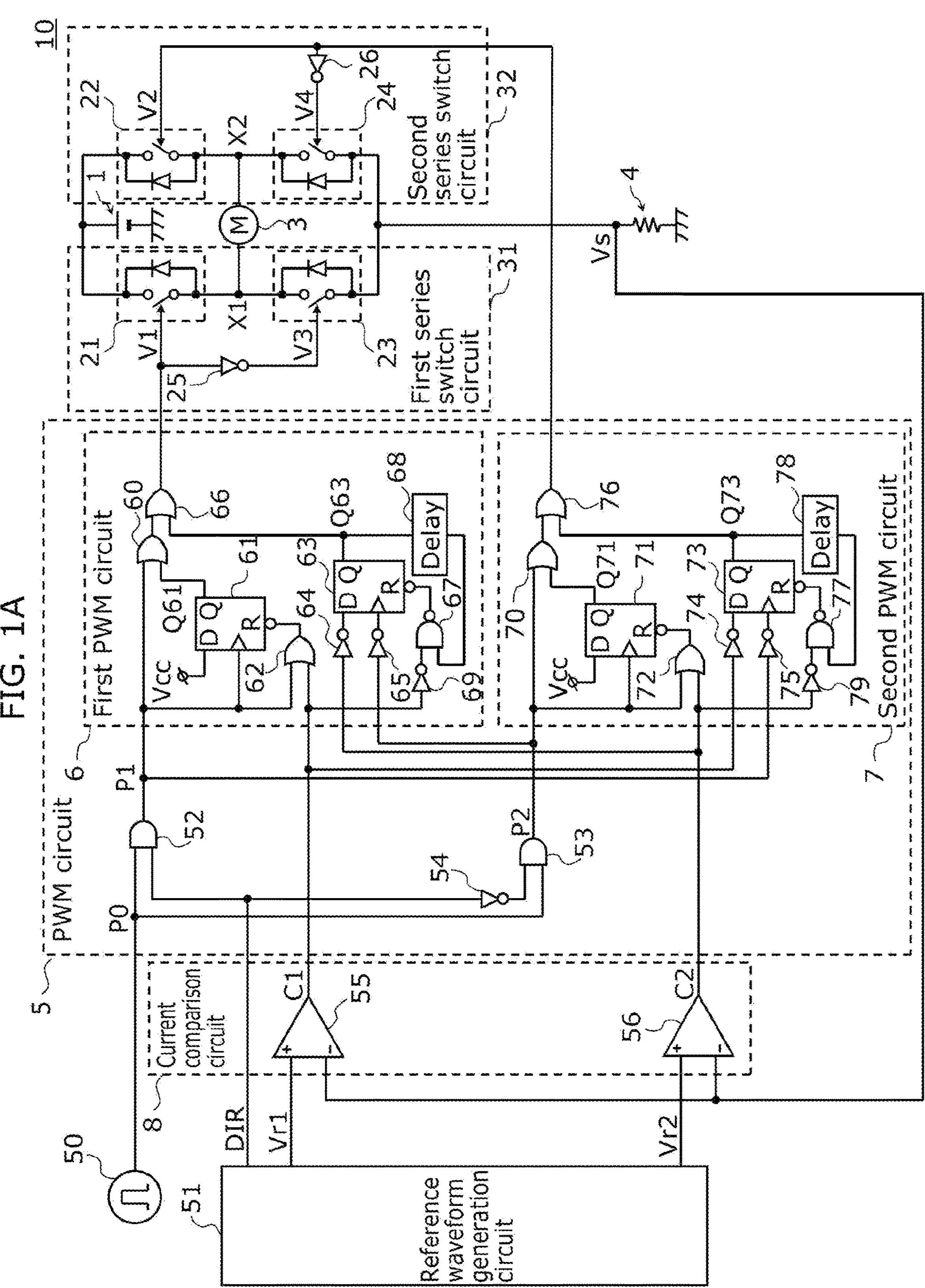
FIG. 1A is a circuit configuration diagram showing a motor driver according to Embodiment 1.

The following describes a motor driver according to Embodiment 1. First, with reference to FIG. 1A, the circuit configuration of the motor driver according to the present embodiment is described. FIG. 1A is a circuit configuration diagram showing motor driver 10 according to the present embodiment. FIG. 1A additionally shows motor 3 that is driven by motor driver 10, and input power source 1 that supplies a direct current power to motor driver 10.

As shown in FIG. 1A, input power source 1 supplies power source voltage Vcc to between the power source line and the ground line. Input power source 1 is, for example, a battery.

Motor driver 10 is a device that drives motor 3. Motor driver 10 includes first series switch circuit 31, second series switch circuit 32, reference pulse generation circuit 50, current detection resistor 4, PWM circuit 5, reference waveform generation circuit 51, and current comparison circuit 8.

First series switch circuit 31 is a series circuit that includes first high-side switch element 21 and first low-side switch element 23. First high-side switch element 21 and first low-side switch element 23 are connected in series at first connection point X1. First connection point X1 is the point connecting first high-side switch element 21 and first low-side switch element 23. In the present embodiment, first series switch circuit 31 further includes inverter 25. Inverter 25 is connected between the control terminal of first low-side switch element 23 and the control terminal of first high-side switch element 21. Inverter 25 inputs, to the control terminal of first low-side switch element 23, drive signal V3, which is the inverted signal of drive signal V1 inputted to the control terminal of first high-side switch element 21.

Second series switch circuit 32 is a series circuit that includes second high-side switch element 22 and second low-side switch element 24, and is connected in parallel to first series switch circuit 31. Second high-side switch element 22 and second low-side switch element 24 are connected in series at second connection point X2. Second connection point X2 is the point connecting second high-side switch element 22 and second low-side switch element 24. First high-side switch element 21 and second high-side switch element 22 are connected by the power source line, and first low-side switch element 23 and second low-side switch element 24 are connected. In the present embodiment, second series switch circuit 32 further includes inverter 26. Inverter 26 is connected between the control terminal of second low-side switch element 24 and the control terminal of second high-side switch element 22. Inverter 26 inputs, to the control terminal of second low-side switch element 24, drive signal V4, which is the inverted signal of drive signal V2 inputted to the control terminal of second high-side switch element 22.

The configurations of first high-side switch element 21, second high-side switch element 22, first low-side switch element 23, and second low-side switch element 24 are not limited to specific configurations. For example, an N-channel MOSFET can be used as each of the switch elements. Using the inverted signal of a signal that is inputted to the control terminal of each of the switch elements, it is also possible to use a P-channel MOSFET as each of the switch elements. In the present disclosure, each of the switch elements is described as an ideal switch that includes a body diode and enters the ON state when conduction occurs between the first terminal and the second terminal in response to the application of a high level (i.e., H-level) drive signal to the control terminal.

Motor 3 is connected between first connection point X1 and second connection point X2 of a bridge circuit including first series switch circuit 31 and second series switch circuit 32.

Current detection resistor 4 is an example of the current detector that outputs a current signal corresponding to motor current IL, which is a current flowing through motor 3. In the present embodiment, current detection resistor 4 is a resistive element connected between the ground line and the connection point of first low-side switch element 23 and second low-side switch element 24. In the following, the resistance value of current detection resistor 4 is represented as "Rs".

As described above, the bridge circuit including first series switch circuit 31 and second series switch circuit 32, motor 3, and current detection resistor 4 are connected between the power source line and the ground line.

According to drive signals V1 to V4 as described above, each of the high-side switch elements and each of the low-side switch elements alternately turn ON and OFF. In reality, however, to prevent a power source ground fault in which simultaneous conduction occurs at the time of switching, a period referred to as "dead time" is provided during which the high-side switch elements and the low-side switch elements are both in the OFF state. Alternatively, an operation mode is also available in which a period is provided during which the high-side switch elements and the low-side switch elements are both in the OFF state. This operation, however, is a well-known technology, and thus is not the essence of the present disclosure. For this reason, to avoid the complication of the description, the present disclosure omits the illustration and description of such operation, and each of the high-side switch elements and each of the low-side switch elements are described as simultaneously and alternately turning ON and OFF.

Reference pulse generation circuit 50 is a circuit that generates, in a predetermined cycle, reference pulse signal P0 having a pulse duration time (i.e., pulse width) greater than 0. This pulse duration time is also referred to as "minimum ON period". The pulse duration time and the predetermined cycle are not limited to a specific time and a specific cycle, respectively. In the present embodiment, the pulse duration time is 2 usec and the predetermined cycle is 10 usec.

Reference waveform generation circuit 51 is a circuit that generates reference waveform signals corresponding to the control target value of motor current IL. In the present embodiment, the reference waveform signals include a first reference waveform signal and a second reference waveform signal. Depending on the rotation position of motor 3, reference waveform generation circuit 51 generates: first reference waveform signal Vr1, which serves as the control target waveform of motor current IL flowing in the direction from first connection point X1 to second connection point X2 (hereinafter also referred to as "positive direction"); second reference waveform signal Vr2, which serves as the control target waveform of motor current IL flowing in the direction from second connection point X2 to first connection point X1 (hereinafter also referred to as "negative direction"); and polarity indication signal DIR which indicates the polarity of the direction in which motor current IL flows. Polarity indication signal DIR is a signal that controls the direction of motor current IL. Polarity indication signal DIR is outputted to PWM circuit 5. In the present embodiment, motor current IL is in the positive direction when polarity indication signal DIR is at a high level and in the negative direction when polarity indication signal DIR is at a low level (i.e., L-level). Stated differently, the period during which polarity indication signal DIR is at a high level corresponds to a first period during which motor current IL flows mainly from first connection point X1 to second connection point X2. The period during which polarity indication signal DIR is at a low level corresponds to a second period during which motor current IL flows mainly from second connection point X2 to first connection point X1.

Figure 1B:
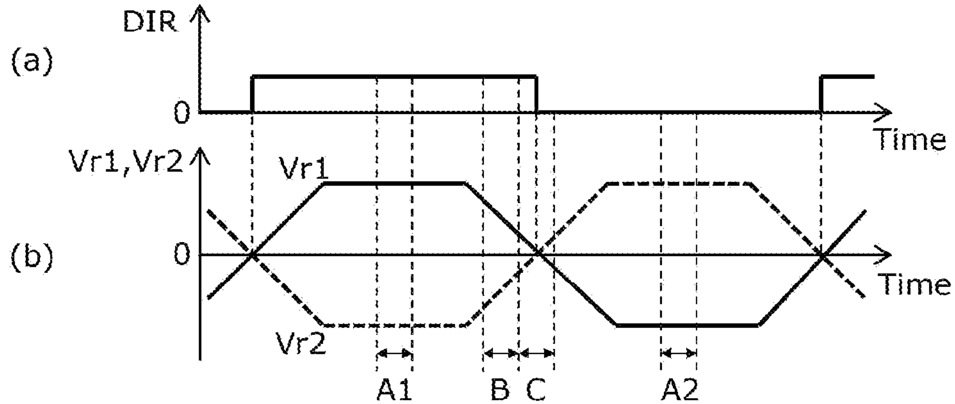
FIG. 1B shows graphs showing an example of the waveforms of a polarity indication signal, a first reference waveform signal, and a second reference waveform signal according to Embodiment 1.

Here, with reference to FIG. 1B, polarity indication signal DIR, first reference waveform signal Vr1, and second reference waveform signal Vr2 are described. FIG. 1B shows graphs showing an example of the waveforms of polarity indication signal DIR, first reference waveform signal Vr1, and second reference waveform signal Vr2 according to the present embodiment. In FIG. 1B, graph (a) shows the waveform of polarity indication signal DIR, and graph (b) shows the waveforms of first reference waveform signal Vr1 and second reference waveform signal Vr2. The horizontal axis of each graph represents time. In graph (b), the solid curve represents the waveform of first reference waveform signal Vr1, and the broken line curve represents the waveform of second reference waveform signal Vr2.

As shown in FIG. 1B, first reference waveform signal Vr1 is a signal that periodically oscillates to be positive and negative with a reference amplitude. Second reference waveform signal Vr2 is a signal that periodically oscillates to be positive and negative with a reference amplitude in antiphase with respect to first reference waveform signal Vr1. Stated differently, second reference waveform signal Vr2 is a signal obtained by reversing the polarity of first reference waveform signal Vr1. In an example shown in FIG. 1B, each of the reference waveform signals is in the form of a trapezoidal wave, but may be in the form of other waveform such as a sinusoidal wave. The switching cycle of each of the switch elements is sufficiently short, compared to the cycle of each of the reference waveform signals. In the following, each of the reference waveform signals is thus described as having a constant value in several cycles of the switching operation.

Current comparison circuit 8 is a circuit that compares the current signal and the reference waveform signals to generate comparison signals. In the present embodiment, the comparison signals include first comparison signal C1 and second comparison signal C2, and current comparison circuit 8 includes: first comparison circuit 55 that compares the current signal with first reference waveform signal Vr1 to generate first comparison signal C1; and second comparison circuit 56 that compares the current signal with second reference waveform signal Vr2 to generate second comparison signal C2. As the current signal, current detection voltage Vs of current detection resistor 4 is inputted to each the comparison circuits. Since each of the comparison circuits has the configuration as described above, first comparison signal C1 is inverted when motor current IL is at first target waveform value Vr1/Rs, and second comparison signal C2 is inverted when motor current IL is at second target waveform value Vr2/Rs. Differential amplifier circuits can be used, for example, as first comparison circuit 55 and second comparison circuit 56.

PWM circuit 5 is a circuit that outputs a first drive signal and a second drive signal in response to receiving a reference pulse signal, the reference waveform signals, and the comparison signals. PWM circuit 5 outputs the first drive signal to first series switch circuit 31 and the second drive signal to second series switch circuit 32 in the first period during which motor current IL flows mainly from first connection point X1 to second connection point X2. Also, PWM circuit 5 outputs the second drive signal to first series switch circuit 31 and the first drive signal to second series switch circuit 32 in the second period during which motor current IL flows mainly from second connection point X2 to first connection point X1.

The first drive signal includes a first pulse that starts synchronously with the start of the reference pulse signal and ends at the timing which is after the pulse duration time has elapsed from the beginning of the reference pulse signal and at which the absolute value of the current signal exceeds the absolute value of the reference waveform signal. In the present embodiment, the first drive signal includes a first pulse that rises in response to the leading edge of the reference pulse signal and falls at the timing which is after the pulse duration time of the reference pulse signal has elapsed after such first pulse rises and at which the absolute value of the current signal exceeds the absolute value of the reference waveform signal.

The second drive signal includes a second pulse that starts after the end of the first pulse and lasts at least during a period until the absolute value of the current signal falls below the absolute value of the reference waveform signal, in the case where the absolute value of the current signal exceeds the absolute value of the reference waveform signal within the pulse duration time of the reference pulse signal. The second drive signal includes no pulse when the absolute value of the current signal does not exceed the absolute value of the reference waveform signal within the pulse duration time of the reference pulse signal. In the present embodiment, the second drive signal is maintained at a low level in the case where the absolute value of the current signal does not exceed the absolute value of the reference waveform signal within the pulse duration time of the reference pulse signal. In the second drive signal, the second pulse rises after the end of the first pulse in the case where the absolute value of the current signal exceeds the absolute value of the reference waveform signal within the pulse duration time of the reference pulse signal.

In the present embodiment, PWM circuit 5 includes first pulse output circuit 52, second pulse output circuit 53, first PWM circuit 6, and second PWM circuit 7.

First pulse output circuit 52 is a circuit that outputs first reference pulse signal P1 including a pulse that is outputted in the first period during which motor current IL flows mainly from first connection point X1 to second connection point X2, in response to receiving reference pulse signal P0. In the present embodiment, reference pulse signal P0 and polarity indication signal DIR are inputted to first pulse output circuit 52, which then outputs first reference pulse signal P1. An AND circuit can be used, for example, as first pulse output circuit 52.

Second pulse output circuit 53 is a circuit that outputs second reference pulse signal P2 including a pulse that is outputted in the second period during which motor current IL flows mainly from second connection point X2 to first connection point X1, in response to receiving reference pulse signal P0. In the present embodiment, reference pulse signal P0 and the inverted signal of polarity indication signal DIR are inputted to second pulse output circuit 53, which then outputs second reference pulse signal P2. An AND circuit can be used, for example, as second pulse output circuit 53. In the present embodiment, the inverted signal of polarity indication signal DIR is obtained by inputting polarity indication signal DIR to inverter 54.

First PWM circuit 6 is a circuit that outputs, to first series switch circuit 31, the first drive signal during the first period in which motor current IL flows mainly from first connection point X1 to second connection point X2, and the second drive signal during the second period in which motor current IL flows mainly from second connection point X2 to first connection point X, on the basis of first comparison signal C1, second comparison signal C2, first reference pulse signal P1, and second reference pulse signal P2. The signal outputted by first PWM circuit 6 corresponds to drive signal V1 inputted to the control terminal of first high-side switch element 21.

First PWM circuit 6 includes OR circuits 60, 62, and 66, D flip-flops 61 and 63, inverters 64, 65, and 69, NAND circuit 67, and delay circuit 68.

First reference pulse signal P1 and output signal Q61 of D flip-flop 61 are inputted to OR circuit 60.

In D flip-flop 61, power source voltage Vcc for a control circuit is applied to the D terminal and first reference pulse signal P1 is inputted to the clock terminal.

First reference pulse signal P1 and first comparison signal C1 are inputted to OR circuit 62. The output of OR circuit 62 is inputted to the reset terminal of D flip-flop 61.

In D flip-flop 63, the inverted signal of second comparison signal C2 is inputted to the D terminal via inverter 64, and the inverted signal of second reference pulse signal P2 is inputted to the clock terminal via inverter 65.

The output of OR circuit 60 and output signal Q63 of D flip-flop 63 are inputted to OR circuit 66, which then outputs drive signal V1.

The delayed signal of output signal Q63 of D flip-flop 63 obtained via delay circuit 68 and the inverted signal of first comparison signal C1 obtained via inverter 69 are inputted to NAND circuit 67. The output of NAND circuit 67 is inputted to the reset terminal of D flip-flop 63.

Second PWM circuit 7 is a circuit that outputs, to second series switch circuit 32, the second drive signal during the first period in which motor current IL flows mainly from first connection point X1 to second connection point X2, and the first drive signal during the second period in which motor current IL flows mainly from second connection point X2 to first connection point X1, on the basis of first comparison signal C1, second comparison signal C2, first reference pulse signal P1, and second reference pulse signal P2. The signal outputted by second PWM circuit 7 corresponds to drive signal V2 inputted to the control terminal of second high-side switch element 22.

Second PWM circuit 7 includes OR circuits 70, 72, and 76, D flip-flops 71 and 73, inverters 74, 75, and 79, NAND circuit 77, and delay circuit 78.

Second reference pulse signal P2 and output signal Q71 of D flip-flop 71 are inputted to OR circuit 70.

In D flip-flop 71, power source voltage Vcc for a control circuit is applied to the D terminal and second reference pulse signal P2 is inputted to the clock terminal.

Second reference pulse signal P2 and second comparison signal C2 are inputted to OR circuit 72. The output of OR circuit 72 is inputted to the reset terminal of D flip-flop 71.

In D flip-flop 73, the inverted signal of first comparison signal C1 is inputted to the D terminal via inverter 74, and the inverted signal of first reference pulse signal P1 is inputted to the clock terminal via inverter 75.

The output of OR circuit 70 and output signal Q73 of D flip-flop 73 are inputted to OR circuit 76, which then outputs drive signal V2.

The delayed signal of output signal Q73 of D flip-flop 73 obtained via delay circuit 78 and the inverted signal of second comparison signal C2 obtained via inverter 79 are inputted to NAND circuit 77. The output of NAND circuit 77 is inputted to the reset terminal of D flip-flop 73.

Figure 2:
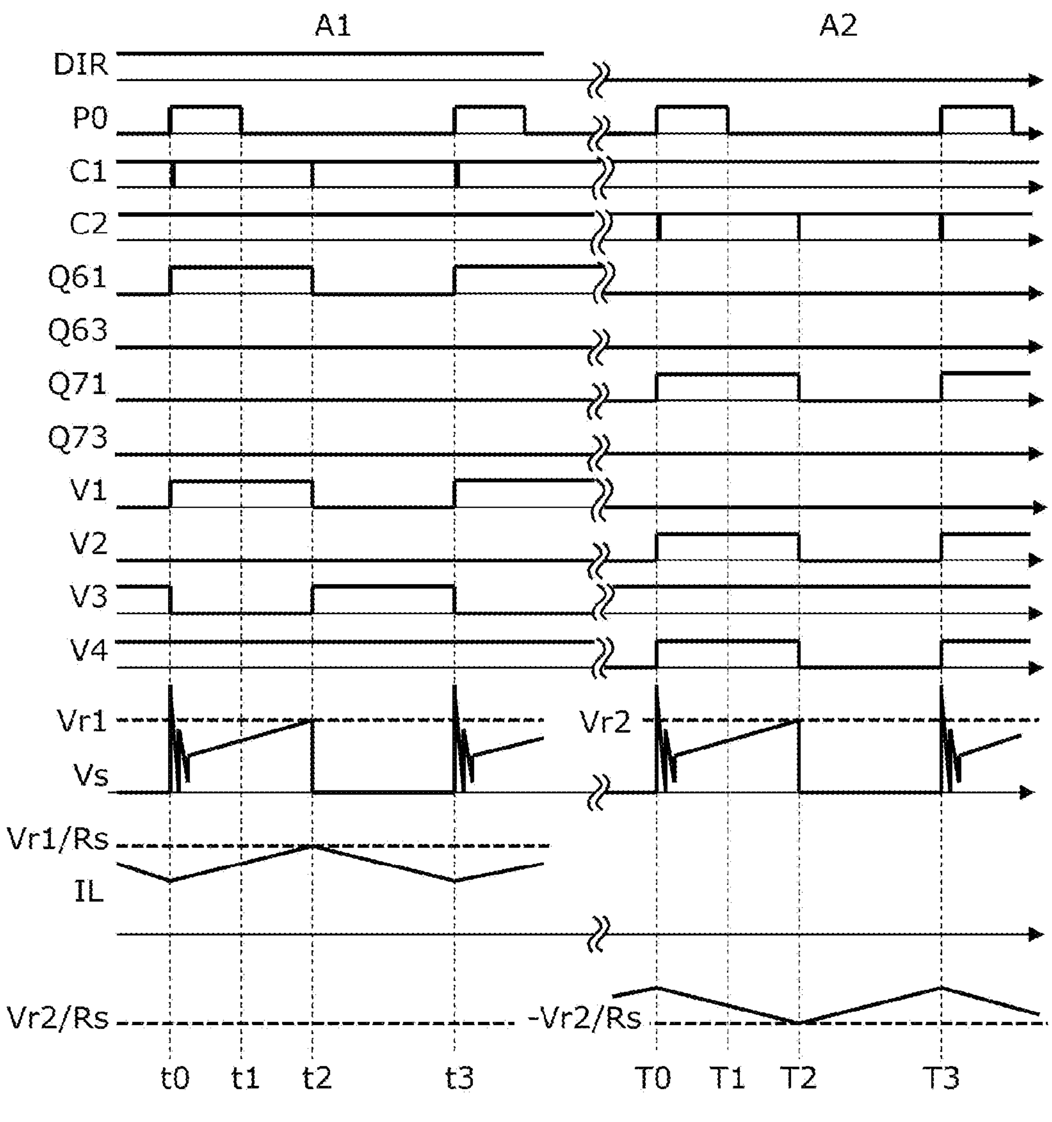
FIG. 2 is a graph showing an example of the waveforms of the signals in sections A1 and A2 in FIG. 1B.
Figure 3A:
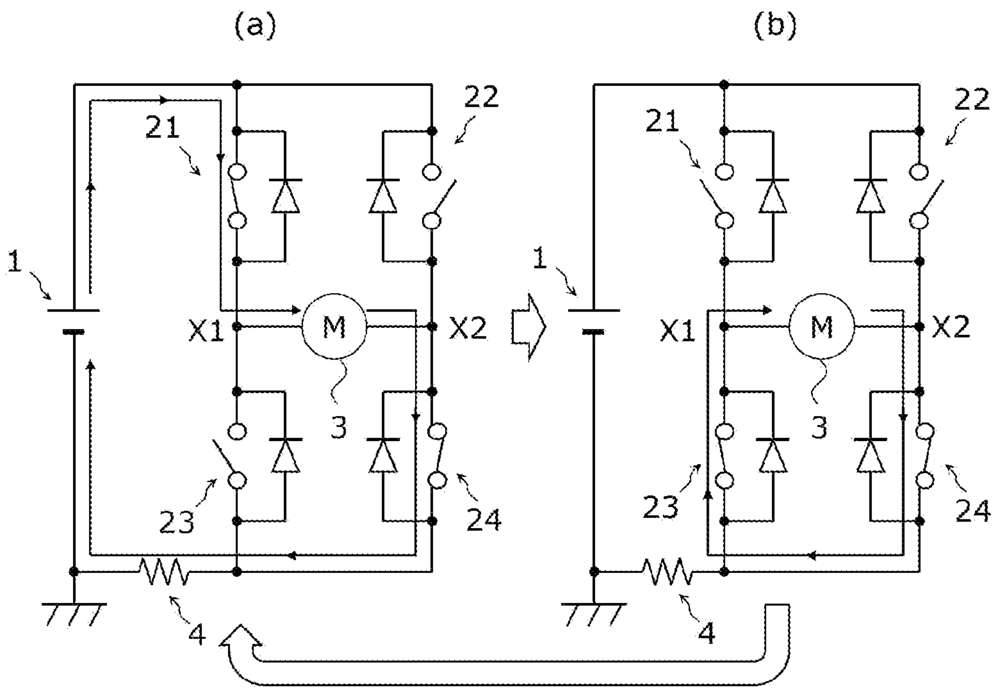
FIG. 3A is a state diagram showing the states of each of the switch elements and the paths of the current in section A1 in FIG. 1B.
Figure 3B:
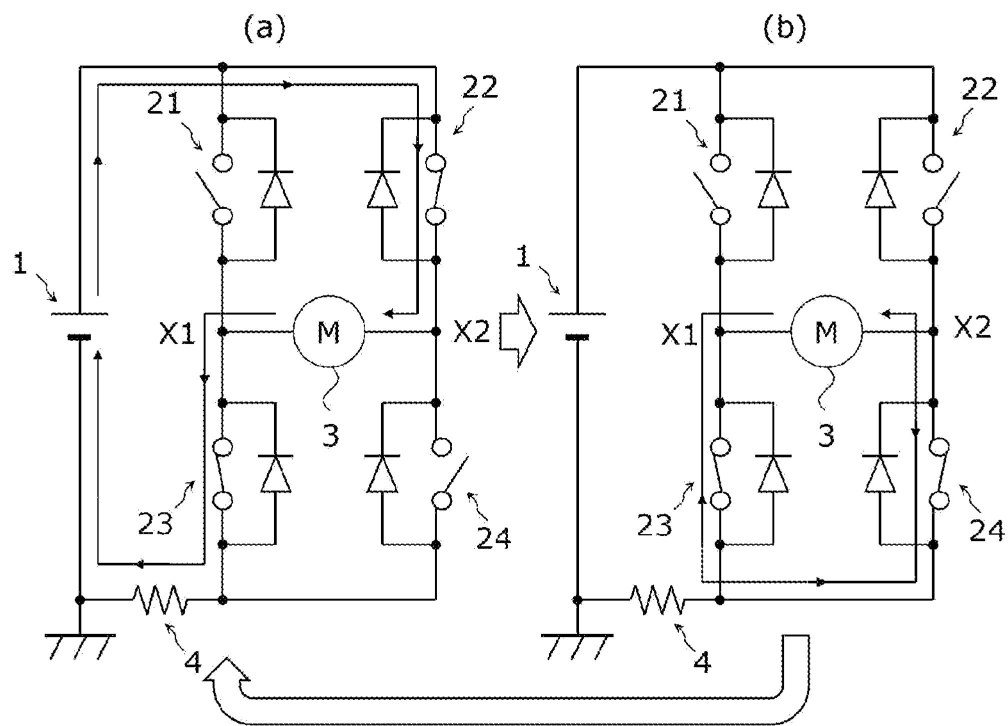
FIG. 3B is a state diagram showing the states of each of the switch elements and the paths of the current in section A2 in FIG. 1B.

The following describes the operation performed by motor driver 10 according to the present embodiment. First, with reference to FIG. 1A to FIG. 3B, the operation is described that is performed by motor driver 10 in the vicinity of the peak values of the reference waveform signals. FIG. 2 is a graph showing an example of the waveforms of polarity indication signal DIR, reference pulse signal P0, first comparison signal C1, second comparison signal C2, output signal Q61 of D flip-flop 61, output signal Q63 of D flip-flop 63, output signal Q71 of D flip-flop 71, output signal Q73 of D flip-flop 73, drive signals V1 to V4, current detection voltage Vs, and motor current IL in sections A1 and A2 in FIG. 1B. The horizontal axis in FIG. 2 represents time. FIG. 3A and FIG. 3B are state diagrams, each showing the states of each of the switch elements and the paths of the current in sections A1 and A2 in FIG. 1B, respectively.

As in section A1, in the case where polarity indication signal DIR is at a high level (H), that is, motor current IL is in the positive direction, and when reference pulse signal P0 rises at time to, first reference pulse signal P1 also rises and drive signal V1 also rises via OR circuit 60 and OR circuit 66. In response to this, as shown in the state diagram (a) in FIG. 3A, first high-side switch element 21 enters the ON state. At the same time, drive signal V2 falls and first low-side switch element 23 enters the OFF state. Since first reference pulse signal P1 is inputted to D flip-flop 61 as a clock signal, with high-level first comparison signal C1 inputted to the reset terminal, output signal Q61 rises. Since the inverted signal of second reference pulse signal P2, which is inputted as a clock signal, is fixed at a high level, output signal Q63 of D flip-flop 63 is maintained at a low level (L). Also, since second reference pulse signal P2 is at a low level, output signal Q71 of D flip-flop 71 with no clock input is maintained at a low level. Output signal Q73 of D flip-flop 73, to which the inverted signal of high-level second comparison signal C2 is inputted to the D terminal, is also maintained at a low level. Drive signal V2, which is the logical sum of these, is thus also maintained at a low level, and second high-side switch element 22 is in the OFF state, and second low-side switch element 24 is in the ON state. In response to the turning ON of first high-side switch element 21, the current flowing from the positive pole of input power source 1 to first high-side switch element 21, motor 3, second low-side switch element 24, current detection resistor 4, and the negative pole of input power source 1 increases, oscillating like a surge. As such, current detection voltage Vs also oscillates, and first comparison signal C1 also oscillates between high and low levels. However, since current detection voltage Vs is subjected to logical OR in OR circuit 62 with high-level first reference pulse signal P1 and subjected to negative AND in NAND circuit 77 with a low-level delayed signal of delay circuit 78 to be described later, the circuit operation is not affected. This state is maintained at least until time t1 at which first reference pulse signal P1 is at a high level, and motor current IL of motor 3, to which the power source voltage is applied in the positive direction, starts increasing in the positive direction. As described above, the pulse duration time of reference pulse signal P0 serves as minimum ON period Tm, which is the minimum value of the mask period.

At time t1 after minimum ON period Tm, first reference pulse signal P1 falls together with reference pulse signal P0. At this time, current detection voltage Vs has not reached first reference waveform signal Vr1, and first comparison signal C1 remains at a high level. As such, D flip-flop 61 is not reset, and this state is maintained until time t2. Stated differently, at times t0 to t2, each of the switch elements, for example, is maintained in the state shown in the state diagram (a) in FIG. 3A.

At time t2, when current detection voltage Vs, which has risen with an increase in motor current IL, reaches first reference waveform signal Vr1, first comparison signal C1 falls, D flip-flop 61 is reset, and output signal Q61 reaches a low level. For this reason, all inputs of OR circuits 60 and 66 reach a low level, drive signal V1 falls, and first high-side switch element 21 enters the OFF state. Drive signal V3 rises and first low-side switch element 23 enters the ON state. At this time, as shown in the state diagram (b) in FIG. 3A, first low-side switch element 23 and second low-side switch element 24 enter the ON state. As a result, motor 3 is short-circuited at both ends and no current flows through current detection resistor 4. Only reverse voltage is applied to the motor coil of motor 3, and motor current IL starts decreasing. This state is referred to as “slow decay”.

Next, at time t3, when reference pulse signal P0 rises again, the operation described for time to is repeated. At times t2 to t3, each of the switch elements, for example, is maintained in the state shown in the state diagram (b) in FIG. 3A.

As described above, in section A1 in FIG. 1B, second high-side switch element 22 is fixed to the OFF state and second low-side switch element 24 is fixed to the ON state, and first high-side switch element 21 and first low-side switch element 23 alternately turn ON and OFF in a predetermined switching cycle. The ON period of first high-side switch element 21 is controlled to be a period that is longer than or equal to minimum ON period Tm and that is until the peak value of motor current IL reaches target waveform value Vr1/Rs.

In contrast to section A1 described above, section A2 in FIG. 1B is a section in the vicinity of the peak value where the polarity of the reference waveform signal is inverted. Also, in section A2 in FIG. 1B, the operation roles of first PWM circuit 6 and second PWM circuit 7 are interchanged, and times T0 to T3 in section A2 correspond to times t0 to t3 in section A1 described above. Stated differently, first high-side switch element 21 is fixed to the OFF state and first low-side switch element 23 is fixed to the ON state, and second high-side switch element 22 and second low-side switch element 24 alternately turn ON and OFF in a predetermined switching cycle. The ON period of second high-side switch element 22 is controlled to be a period that is longer than or equal to minimum ON period Tm and that is until the peak value of motor current IL reaches target waveform value Vr2/Rs. Each of the switch elements, for example, is maintained in the state shown in the state diagram (a) in FIG. 3B at times T0 to T2, and in the state shown in the state diagram (b) in FIG. 3B at times T2 to T3.

Next, the operation is described that is performed when the reference waveform signal is dynamically decaying, as in section B in FIG. 1B. Motor driver 10 controls motor current IL to cause it to follow the decay of the reference waveform signal. For this reason, the ON period of first high-side switch element 21 also decreases. However, since the ON period of first high-side switch element 21 does not become shorter than minimum ON period Tm, the peak value of motor current IL becomes greater than the control target value. Here, with reference to FIG. 4 and FIG. 5, the process is described in which the peak value of motor current IL that exceeds the control target value is corrected.

Figure 4:
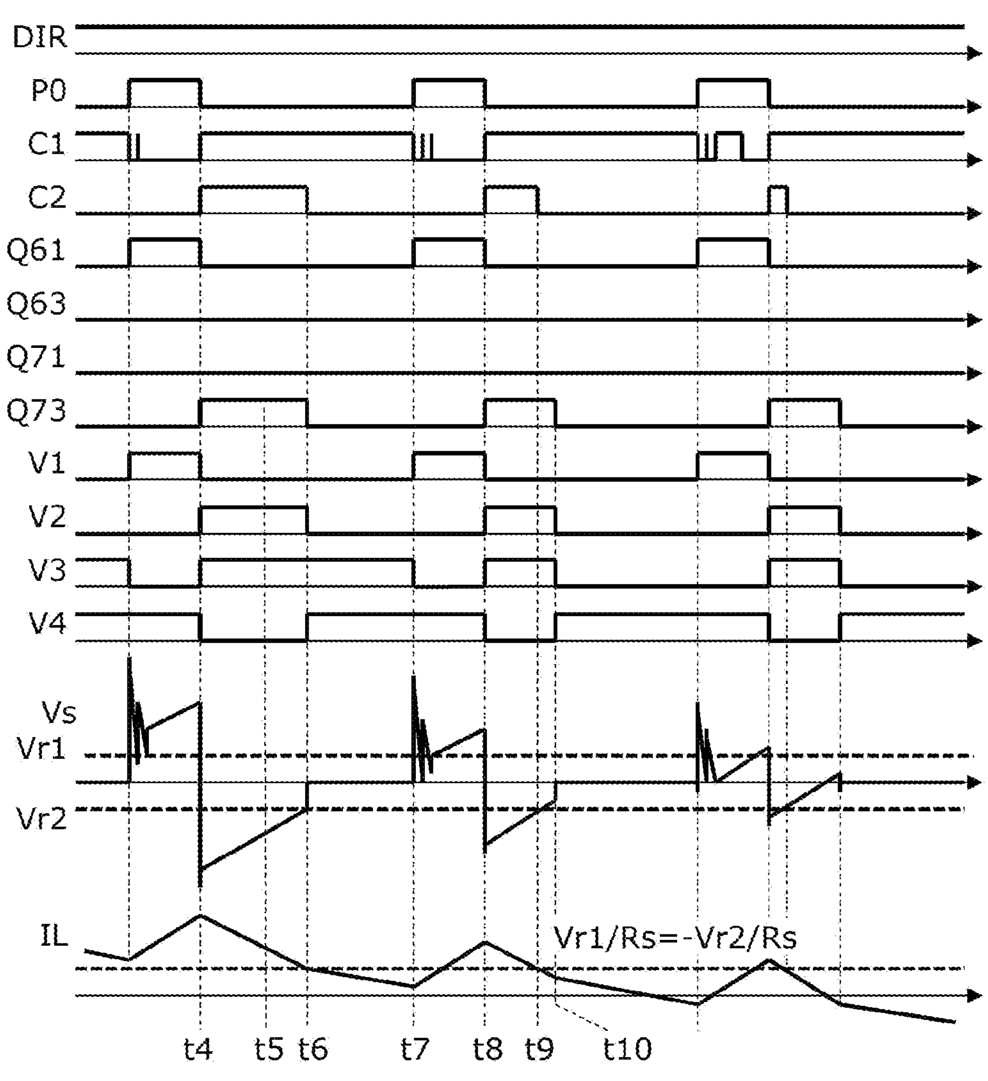
FIG. 4 is a graph showing an example of the waveforms of the signals in section B in FIG. 1B.
Figure 5:
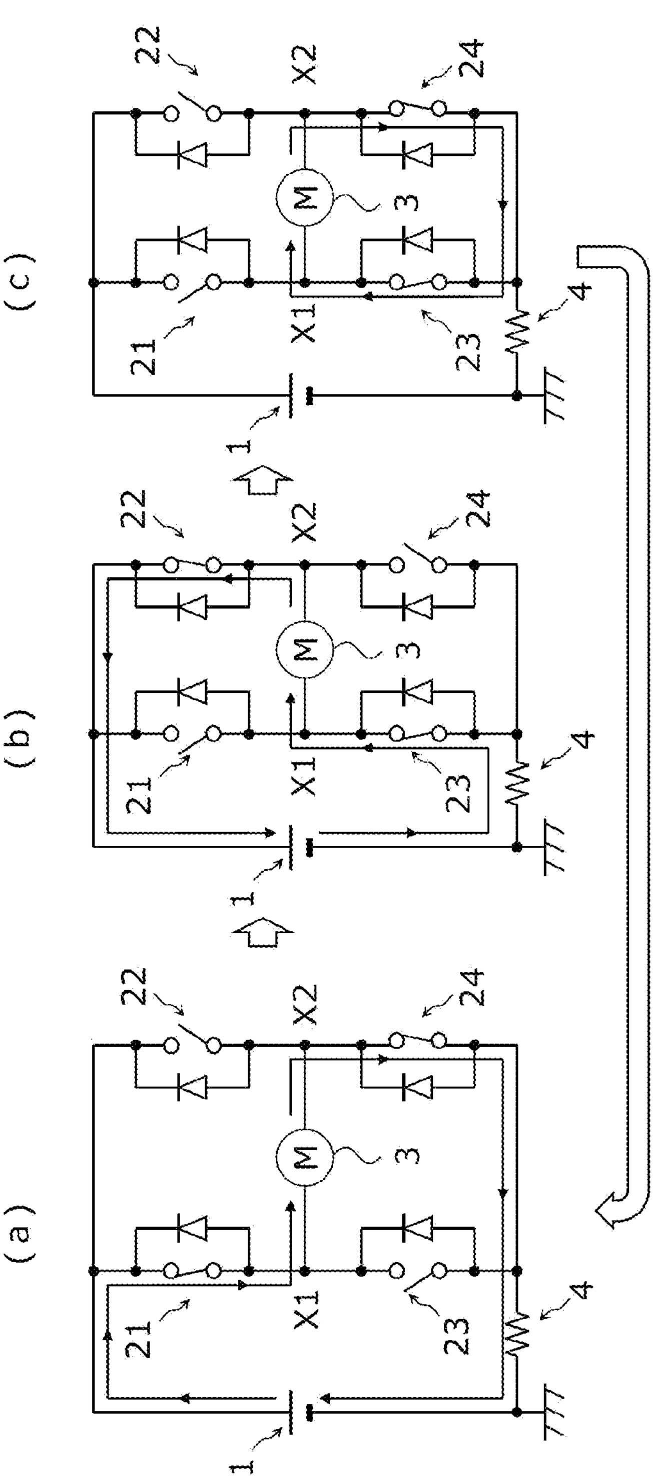
FIG. 5 is a state diagram showing the states of each of the switch elements and the paths of the flowing current in section B in FIG. 1B.

FIG. 4 is a graph showing an example of the waveforms of polarity indication signal DIR, reference pulse signal P0, first comparison signal C1, second comparison signal C2, output signal Q61 of D flip-flop 61, output signal Q63 of D flip-flop 63, output signal Q71 of D flip-flop 71, output signal Q73 of D flip-flop 73, drive signals V1 to V4, current detection voltage Vs, and motor current IL in section B in FIG. 1B. FIG. 5 is a state diagram showing the states of each of the switch elements and the paths of the flowing current in section B in FIG. 1B.

At time t4 in FIG. 4, first reference pulse signal P1 falls in accordance with reference pulse signal P0, with motor current IL exceeding the control target value. At this time, since motor current IL exceeds the control target value and first comparison signal C1 is at a low level, D flip-flop 61 is reset and output signal Q61 falls. As such, drive signal V1 also falls, and first high-side switch element 21 enters the OFF state and first low-side switch element 23 enters the ON state. Also, in D flip-flop 73, first reference pulse signal P1 is inputted as a clock signal at the trailing edge thereof, with a high level signal, which is the inverted signal of first comparison signal C1, applied to the D terminal. As such, D flip-flop 73 raises output signal Q73. In response to the leading edge of output signal Q73, drive signal V2 rises via OR circuit 76, and second high-side switch element 22 enters the ON state and second low-side switch element 24 enters the OFF state. For this reason, power source voltage Vcc is applied to motor 3 in the negative direction, and motor current IL starts decreasing. The state of each of the switch elements transits from the state shown in the state diagram (a) in FIG. 5 to the state shown in the state diagram (b) in FIG. 5, and the current supplied from input power source 1 and flowing through current detection resistor 4 flows backward to be a regenerative current. In contrast to the foregoing slow decay state in which motor 3 is short-circuited at both ends, this state in which motor current IL rapidly decreases under the application of reverse voltage, is referred to as "fast decay". At this time, since the regenerative current is below control target value Vr2/Rs corresponding to second reference waveform signal Vr2, second comparison signal C2 reaches a high level.

Output signal Q73 of D flip-flop 73 is inputted to the reset terminal of D flip-flop 73 via delay circuit 78 and NAND circuit 77. At time t5 after the delay time, the output of delay circuit 78 falls. However, since motor current IL is still greater than or equal to the control target value and the inverted signal of second comparison signal C2 is at a low level, the output of NAND circuit 77 is maintained at a high level, and the state of each of the switch elements is maintained, without D flip-flop 73 being reset.

At time t6, when current detection voltage Vs, which has been rising (absolute value decreases), reaches second reference waveform signal Vr2, second comparison signal C2 falls to a low level, and D flip-flop 73 is reset and output signal Q73 also falls. As such, drive signal V2 falls, second high-side switch element 22 enters the OFF state, and second low-side switch element 24 enters the ON state. As a result, the state of each of the switch elements transits from the state shown in the state diagram (b) in FIG. 5 to the slow decay state shown in the state diagram (c) in FIG. 5.

At time t7, when reference pulse signal P0 rises, first reference pulse signal P1 also rises, drive signal V1 also rises via OR circuit 60 and OR circuit 66, and first high-side switch element 21 enters the ON state. At the same time, drive signal V2 falls, and first low-side switch element 23 enters the OFF state. The state of each of the switch elements returns to the state shown in the state diagram (a) in FIG. 5, and motor current IL of motor 3, to which the power source voltage is applied in the positive direction, starts increasing in the positive direction. In contrast to the previous cycle (cycle including time t4), motor current IL decays due to the fast decay state, and the level of current detection voltage Vs also drops.

However, the level of first reference waveform signal Vr1 is also low, and so, when minimum ON period Tm is reached at time t8 and reference pulse signal P0 and first reference pulse signal P1 fall, motor current IL exceeds the control target value and first high-side switch element 21 enters the OFF state. As a result, the state of each of the switch elements transits to the fast decay state again shown in the state diagram (b) in FIG. 5. In this cycle, at time t9 in the fast decay state, motor current IL falls below control target value −Vr2/Rs (current detection voltage Vs exceeds second reference waveform signal Vr2), and second comparison signal C2 falls. However, since the delayed signal of output signal Q73 of D flip-flop 73 has not arrived, the state remains the same.

At time t10, when the delayed signal of output signal Q73 of D flip-flop 73 rises, D flip-flop 73 is reset and output signal Q73 falls, and second high-side switch element 22 enters the OFF state. As a result, the state of each of the switch elements transits to the slow decay state again shown in the state diagram (c) in FIG. 5. Stated differently, the delay time of output signal Q73 of D flip-flop 73 caused by delay circuit 78 serves as the minimum period in the fast decay state. Thereafter, the foregoing operation is repeated and motor current IL converges to the target waveform.

Figure 6:
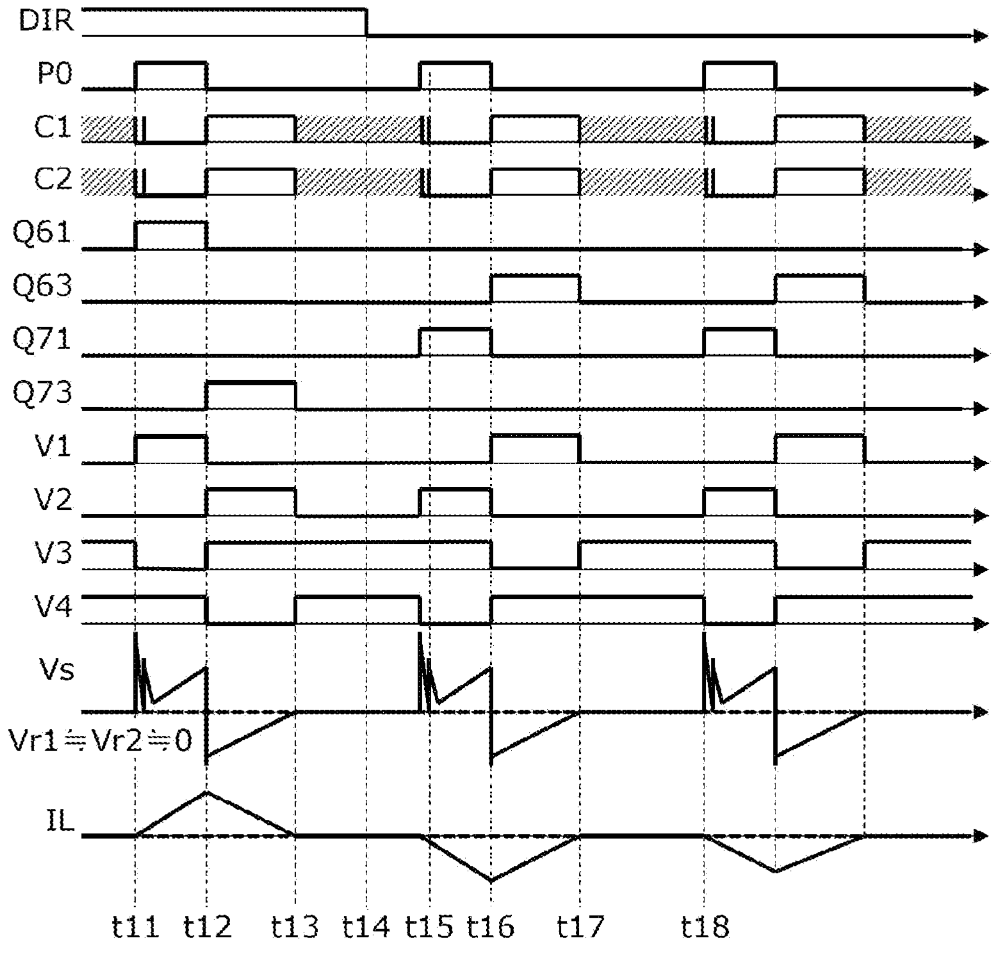
FIG. 6 is a graph showing an example of the waveforms of the signals in section C in FIG. 1B.

Next, with reference to FIG. 6, the operation performed in section C in FIG. 1B is described. FIG. 6 is a graph showing an example of the waveforms of polarity indication signal DIR, reference pulse signal P0, first comparison signal C1, second comparison signal C2, output signal Q61 of D flip-flop 61, output signal Q63 of D flip-flop 63, output signal Q71 of D flip-flop 71, output signal Q73 of D flip-flop 73, drive signals V1 to V4, current detection voltage Vs, and motor current IL in section C in FIG. 1B. Section C is a region in which the level of polarity indication signal DIR changes from high to low and motor current IL should be crossing zero, and in which first reference waveform signal Vr1 and second reference waveform signal Vr2 are almost zero.

At time t11, when reference pulse signal P0 rises, drive signal V1 also rises, and first high-side switch element 21 enters the ON state. At the same time, drive signal V2 falls and first low-side switch element 23 enters the OFF state. Since first reference waveform signal Vr1 and second reference waveform signal Vr2 are almost zero, first comparison signal C1 and second comparison signal C2 reach a low level.

At time t12, when minimum ON period Tm is reached and first reference pulse signal P1 falls, D flip-flop 61 is reset and drive signal V1 also reaches a low level together with output signal Q61. As a result, first high-side switch element 21 enters the OFF state and first low-side switch element 23 enters the ON state. Meanwhile, first reference pulse signal P1 is inputted to D flip-flop 73 as a clock signal at the trailing edge thereof, and output signal Q73 rises. As a result, drive signal V2 also reaches a high level, and second high-side switch element 22 enters the ON state and second low-side switch element 24 enters the OFF state. The state of each of the switch elements transits from the state shown in the state diagram (a) in FIG. 5 to the fast decay state shown in the state diagram (b) in FIG. 5. Motor current IL decreases, current detection voltage Vs becomes negative, and first comparison signal C1 and second comparison signal C2 reach a high level.

At time t13 after the delay time caused by delay circuit 78, when motor current IL and current detection voltage Vs reach zero, which is the control target value, first comparison signal C1 and second comparison signal C2 reach a low level, D flip-flop 73 is reset, and output signal Q73 reaches a low level. As a result, drive signal V2 also reaches a low level, second high-side switch element 22 enters the OFF state, and second low-side switch element 24 enters the ON state. The state of each of the switch elements transits from the state shown in the state diagram (b) in FIG. 5 to the slow decay state shown in the state diagram (c) in FIG. 5.

Note that time t13 is described as the time after the delay time of delay circuit 78, but there can be the case where motor current IL reaches zero first, after which the state of each of the switch elements transits to the slow decay state after the elapse of the delay time. In this case, motor current IL flows in the negative direction, but motor current IL decays in the slow decay state. Although it depends on the properties and conditions of motor 3, the reverse voltage is assumed to be small in the vicinity of the zero-crossing point and motor current IL in the slow decay state is also assumed to be zero or decay to be a small value.

In the slow decay state, no current flows through current detection resistor 4, and current detection voltage Vs is zero, which is the same as the control target value. As such, first comparison signal C1 and second comparison signal C2 are indeterminate. However, since no reference is made to first comparison signal C1 and second comparison signals C2 in the slow decay state, the operation is not affected. To avoid such indeterminate state, hysteresis or offset may be set in first comparison circuit 55 and second comparison circuit 56.

At time t14, when polarity indication signal DIR changes to a low level, first reference pulse signal P1 is fixed to a low level, and the state of motor driver 10 changes so that second reference pulse signal P2 is outputted. At time t15 which follows, when reference pulse signal P0 rises and is inputted to D flip-flop 71 as a clock signal and output signal Q71 rises, drive signal V2 rises via OR circuits 70 and 76. Second high-side switch element 22 thus enters the ON state and second low-side switch element 24 enters the OFF state. Power source voltage Vcc is applied to motor 3 in the negative direction, and motor current IL starts increasing in the negative direction.

At time t16, second high-side switch element 22 enters the OFF state and first high-side switch element 21 enters the ON state, and the state of each of the switch elements transits to the fast decay state. At time t17, first high-side switch element 21 enters the OFF state, and the state of each of the switch elements transits to the slow decay state. The operation performed in section C described above is different in that the role is shifted from first PWM circuit 6 to second PWM circuit 7, but is the same as the foregoing operations, resulting in a smooth reverse of the polarity of motor current IL.

As described above, in peak current control performed by motor driver 10 according to the present embodiment, in which motor current IL supplied from input power source 1 is detected and is caused to follow first target waveform value Vr1/Rs when in the positive direction and second target waveform value Vr2/Rs when in the negative direction, it is possible to maintain the target current waveform even in the vicinity of the zero-crossing point, by providing a period in which each of the switch elements is in the fast decay state until motor current IL decreases to the target current, when such motor current IL exceeds the target current in minimum ON period Tm.

Embodiment 2

The following describes a motor driver according to Embodiment 2. The motor driver according to the present embodiment differs from motor driver 10 according to Embodiment 1 mainly in that the reference waveform generation circuit generates only one reference waveform signal. With reference to FIG. 7A to FIG. 10, the motor driver according to the present embodiment is described, focusing on the differences from motor driver 10 according to Embodiment 1.

Figure 7A:
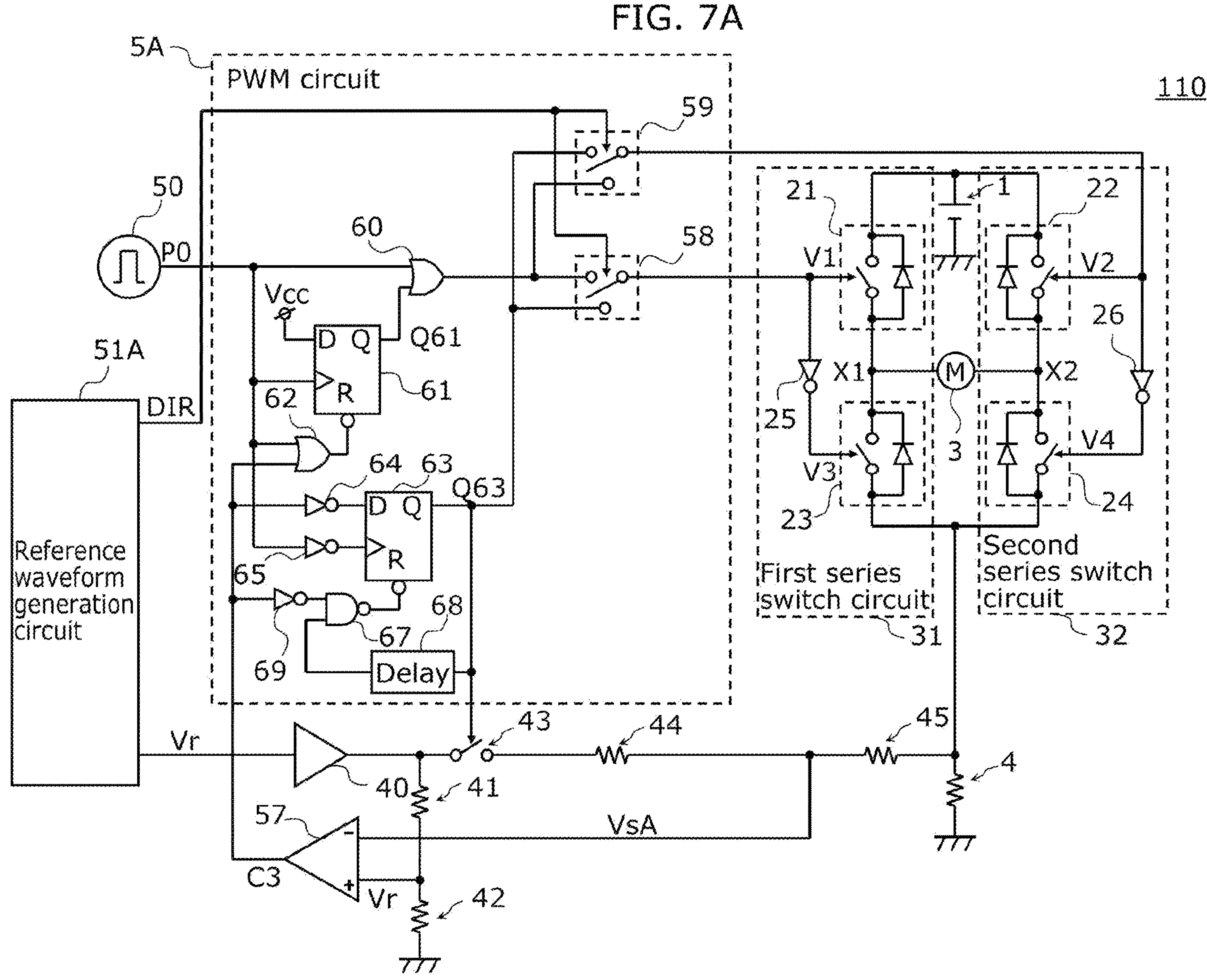
FIG. 7A is a circuit configuration diagram showing a motor driver according to Embodiment 2.

FIG. 7A is a circuit configuration diagram showing motor driver 110 according to the present embodiment. In FIG. 7A, the same elements as those in FIG. 1A are given the same reference signs and their descriptions are omitted.

As shown in FIG. 7A, motor driver 110 according to the present embodiment includes first series switch circuit 31, second series switch circuit 32, reference pulse generation circuit 50, current detection resistor 4, PWM circuit 5A, reference waveform generation circuit 51A, and current comparison circuit 57. In the present embodiment, motor driver 110 further includes amplifier 40, resistors 41, 42, 44, and 45, and switch 43.

Figure 7B:
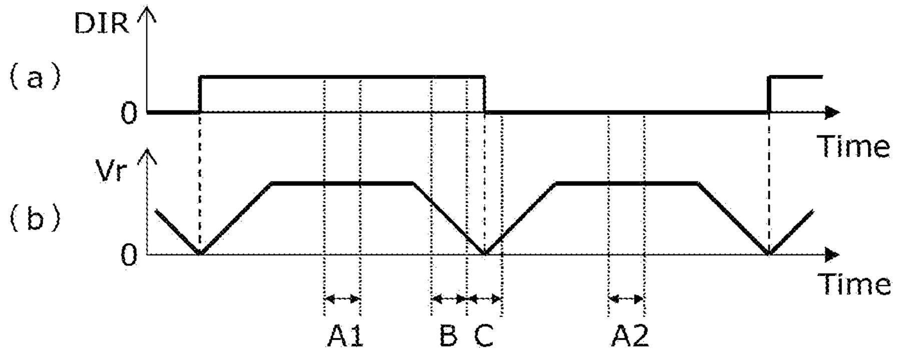
FIG. 7B shows graphs showing an example of the waveforms of a polarity indication signal and a reference waveform signal according to Embodiment 2.

Reference waveform generation circuit 51A according to the present embodiment generates reference waveform signal Vr whose signal level is 0 or higher. With reference to FIG. 7B, reference waveform signal Vr is described. FIG. 7B shows graphs showing an example of the waveforms of polarity indication signal DIR and reference waveform signal Vr according to the present embodiment. In FIG. 7B, graph (a) shows an example of the waveform of polarity indication signal DIR, and graph (b) shows an example of the waveform of reference waveform signal Vr. The horizontal axis of each graph represents time. As shown in FIG. 7B, reference waveform signal Vr maintains a signal level of 0 or higher and includes no negative signal.

PWM circuit 5A according to the present embodiment includes first switching circuit 58 and second switching circuit 59, in addition to the same circuits included in first PWM circuit 6.

Instead of first reference pulse signal P1 and second reference pulse signal P2 according to Embodiment 1, reference pulse signal P0 is inputted to PWM circuit 5A. Also, PWM circuit 5A does not include OR circuit 66, and the output of OR circuit 60 and output signal Q63 of D flip-flop 63 are inputted to first switching circuit 58 and second switching circuit 59.

First switching circuit 58 is a circuit that outputs the first drive signal to first series switch circuit 31 in the first period during which motor current IL flows mainly from first connection point X1 to second connection point X2 and to second series switch circuit 32 in the second period during which motor current IL flows mainly from second connection point X2 to first connection point X1. Polarity indication signal DIR from reference waveform generation circuit 51A, the output signal of OR circuit 60, and output signal Q63 of D flip-flop 63 are inputted to first switching circuit 58. In accordance with polarity indication signal DIR, first switching circuit 58 outputs, to first series switch circuit 31, the output signal of OR circuit 60 or output signal Q63 of D flip-flop 63.

Second switching circuit 59 is a circuit that outputs the second drive signal to second series switch circuit 32 in the first period during which motor current IL flows mainly from first connection point X1 to second connection point X2 and to first series switch circuit 31 in the second period during which motor current IL flows mainly from second connection point X2 to first connection point X1. Polarity indication signal DIR from reference waveform generation circuit 51A, the output signal of OR circuit 60, and output signal Q63 of D flip-flop 63 are inputted to second switching circuit 59. In accordance with polarity indication signal DIR, second switching circuit 59 outputs, to first series switch circuit 31, the output signal of OR circuit 60 or output signal Q63 of D flip-flop 63.

The output of OR circuit 60 in PWM circuit 5A becomes drive signal V1 via first switching circuit 58, when polarity indication signal DIR is at a high level, and becomes drive signal V2 via second switching circuit 59, when polarity indication signal DIR is at a low level. Meanwhile, output signal Q63 of D flip-flop 63 becomes drive signal V2 via second switching circuit 59, when polarity indication signal DIR is at a high level, and becomes drive signal V1 via first switching circuit 58, when polarity indication signal DIR is at a low level.

The present embodiment differs from Embodiment 1 also in a target to be subjected to a comparison performed in current comparison circuit 57. In Embodiment 1, current detection voltage Vs of current detection resistor 4 is compared with first reference waveform signal Vr1. In the present embodiment, however, reference waveform signal Vr is once amplified by N times by amplifier 40, divided by resistor 41 and resistor 42, and converted back to reference waveform signal Vr again to be inputted to current comparison circuit 57. Meanwhile, detection voltage VsA obtained from voltage Vs of current detection resistor 4 via resistor 45 whose resistance value R5 is inputted to current comparison circuit 57, and compared with the foregoing reference waveform signal (divided voltage) Vr, and comparison signal C3 is outputted. Further, a series circuit including switch 43, which opens and closes in accordance with output signal Q63 of D flip-flop 63, and resistor 44 whose resistance value is R4 is connected between the output of amplifier 40 (voltage N·Vr) and resistor 45 (voltage VsA).

With the above configuration, when output signal Q63 of D flip-flop 63 is at a low level, that is, when not in the fast decay state, switch 43 is in the OFF state, and VsA=Vs is satisfied. Stated differently, comparison signal C3 outputted by current comparison circuit 57 is the result obtained by comparing current detection voltage Vs with reference waveform signal Vr. Meanwhile, when output signal Q63 of D flip-flop 63 is at a high level, that is, when in the fast decay state, switch 43 is in the ON state, and detection voltage VsA is biased by N·Vr, which is the output of amplifier 40, to be represented as in the following expression:

$$VsA=(R4\cdot Vs+R5\cdot N\cdot Vr)/(R4+R5)$$

This voltage VsA is compared with reference waveform signal Vr. As such, by obtaining Vs from VsA=Vr, the following relationship is obtained:

$$Vs=\{1-(N-1)-R5/R4\}\cdot Vr$$

Here, by setting (N−1)·/R5/R4=2 (where, for example, N=3, R4=R5), comparison signal C3 is inverted when Vs=−Vr is satisfied. That is to say, in the fast decay state, comparison signal C3 outputted by current comparison circuit 57 is equivalently the result obtained by comparing current detection voltage Vs with negative reference waveform signal −Vr. Stated differently, when the second drive signal turns ON the first high-side switch element or the second high-side switch element (i.e., when the second drive signal is at a high level), current comparison circuit 57 equivalently compares current detection voltage Vs (i.e., current signal) with the signal obtained by reversing the polarity of reference waveform signal Vr to negative.

Figure 8:
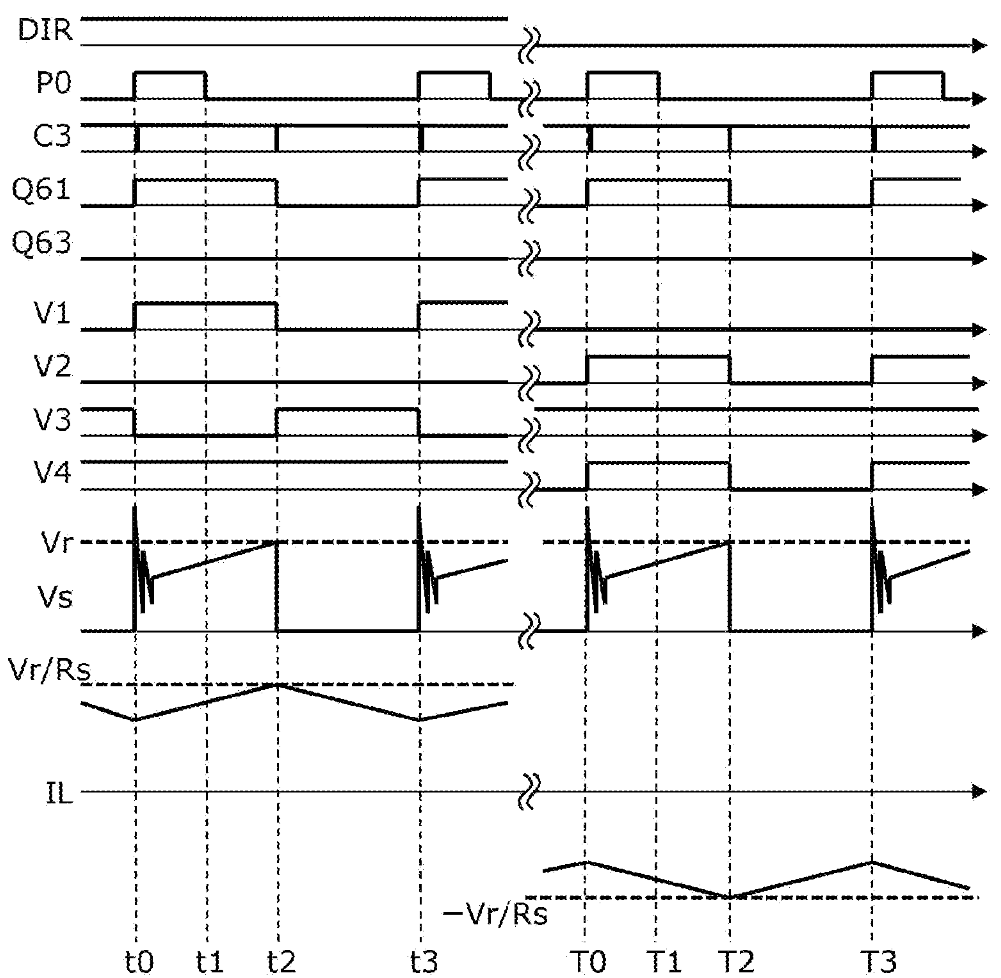
FIG. 8 is a graph showing an example of the waveforms of the signals in sections A1 and A2 in FIG. 7B.
Figure 9:
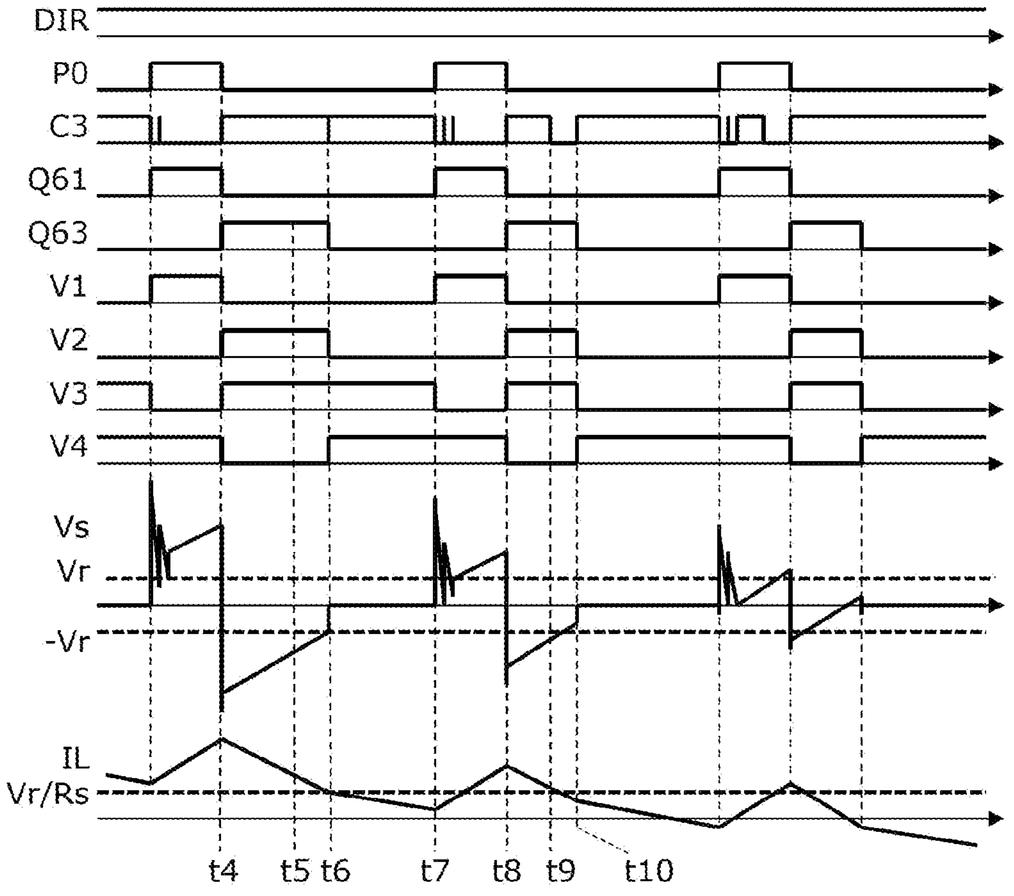
FIG. 9 is a graph showing an example of the waveforms of the signals in section B in FIG. 7B.
Figure 10:
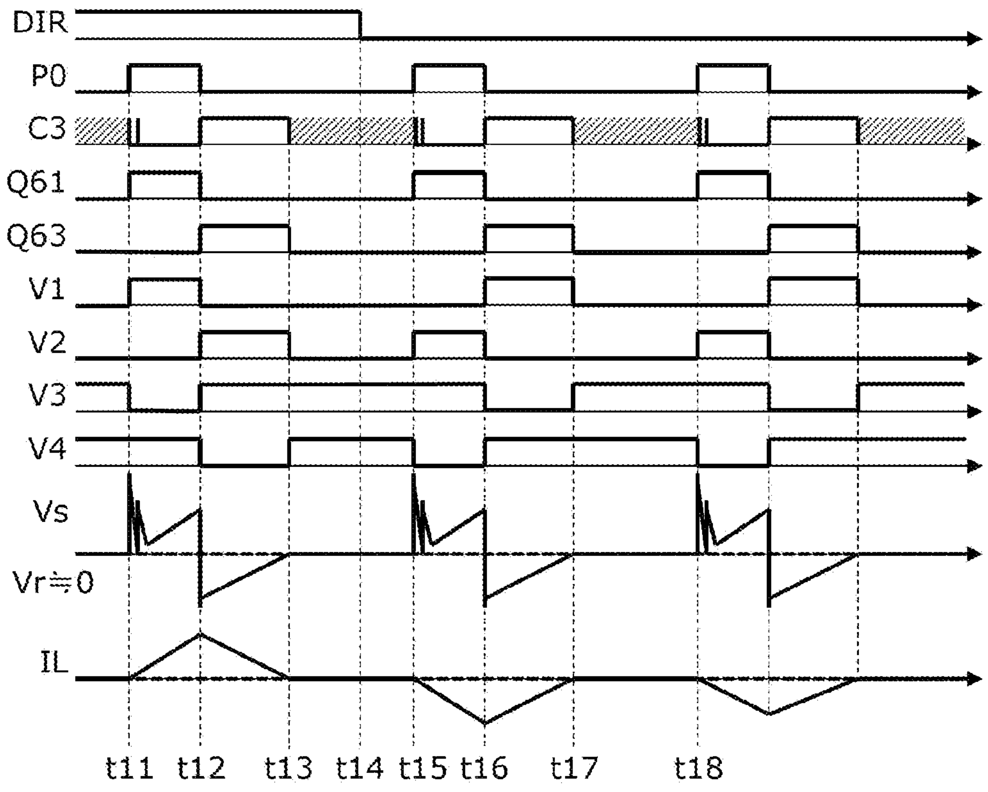
FIG. 10 is a graph showing an example of the waveforms of the signals in section C in FIG. 7B.

With reference to FIG. 8 to FIG. 10, the operation performed by motor driver 110 according to the present embodiment is described. FIG. 8 is a graph showing an example of the waveforms of polarity indication signal DIR, reference pulse signal P0, comparison signal C3, output signal Q61 of D flip-flop 61, output signal Q63 of D flip-flop 63, drive signals V1 to V4, current detection voltage Vs, and motor current IL in sections A1 and A2 in FIG. 7B. The state of each of the switch elements and the path of the flowing current are the same as those in FIG. 3A and FIG. 3B. With reference to FIG. 7A, FIG. 7B, and FIG. 8, the operation that is performed in the vicinity of the peak of the reference waveform is described.

In the case where polarity indication signal DIR is at a high level, that is, motor current IL is in the positive direction, and when reference pulse signal P0 rises at time to, drive signal V1 also rises via OR circuit 60 and first switching circuit 58, and first high-side switch element 21 enters the ON state. At the same time, drive signal V2 falls and first low-side switch element 23 enters the OFF state. Since reference pulse signal P0 is inputted to D flip-flop 61 as a clock signal, with high-level comparison signal C3 inputted to the reset terminal, output signal Q61 of D flip-flop 61 also rises. Meanwhile, output signal Q63 of D flip-flop 63, in which the inverted signal of high-level comparison signal C3 is inputted to the D terminal, is at a low level, and output signal Q63 becomes drive signal V2 via second switching circuit 59. As such, second high-side switch element 22 is in the OFF state and second low-side switch element 24 is in the ON state. In response to the turning ON of first high-side switch element 21, the current flowing from the positive pole of input power source 1 to first high-side switch element 21, motor 3, second low-side switch element 24, current detection resistor 4, and the negative pole of input power source 1 increases, oscillating like a surge. As such, current detection voltage Vs also oscillates, and comparison signal C3 also oscillates between high and low levels. However, since current detection voltage Vs is subjected to logical OR in OR circuit 62 with high-level reference pulse signal P0 and subjected to negative AND in NAND circuit 67 with a low-level delayed signal of delay circuit 68 to be described later, the circuit operation is not affected. This state is maintained at least until time t1 at which reference pulse signal P0 is at a high level, and motor current IL of motor 3, to which the power source voltage is applied in the positive direction, starts increasing in the positive direction. As described above, the pulse duration time of reference pulse signal P0 serves as minimum ON period Tm, which is the minimum value of the mask period.

At time t1 after minimum ON period Tm, reference pulse signal P0 falls. At this time, current detection voltage Vs has not reached reference waveform signal Vr, and comparison signal C3 remains at a high level. As such, D flip-flop 61 is not reset, and this state is maintained until time t2. At times t0 to t2, each of the switch elements, for example, is maintained in the state shown in the state diagram (a) in FIG. 3A.

At time t2, when current detection voltage Vs, which has risen with an increase of motor current IL, reaches reference waveform signal Vr, comparison signal C3 falls, and D flip-flop 61 is reset and output signal Q61 reaches a low level. For this reason, all inputs of OR circuits 60 reach a low level, drive signal V1 falls, and first high-side switch element 21 enters the OFF state. Drive signal V3 rises and first low-side switch element 23 enters the ON state.

Since first low-side switch element 23 and second low-side switch element 24 enter the ON state, motor 3 is short-circuited at both ends and no current flows through current detection resistor 4. Only reverse voltage is applied to the motor coil, resulting in the slow decay state in which motor current IL starts decreasing.

Next, at time t3, when reference pulse signal P0 rises again, the operation described for time to is repeated. At times t2 to t3, each of the switch elements, for example, is maintained in the state shown in the state diagram (b) in FIG. 3A.

As described above, in section A1 in FIG. 7B, second high-side switch element 22 is fixed to the OFF state and second low-side switch element 24 is fixed to the ON state, and first high-side switch element 21 and first low-side switch element 23 alternately turn ON and OFF in a predetermined switching cycle. The ON period of first high-side switch element 21 is controlled to be a period that is longer than or equal to minimum ON period Tm and that is until the peak value of motor current IL reaches target waveform value Vr/Rs.

In section A2 in FIG. 7B, the operation performed by PWM circuit 5A is the same as that performed in section A1 described above. However, since polarity indication signal DIR is at a low level, the states of first switching circuit 58 and second switching circuit 59 differ from those in section A1. As such, the output signal of OR circuit 60 becomes drive signal V2 and output signal Q63 of D flip-flop 63 becomes drive signal V1. Times T0 to T3 in section A2 correspond to times t0 to t3 in section A1 described above, and first high-side switch element 21 is fixed to the OFF state and first low-side switch element 23 is fixed to the ON state, and second high-side switch element 22 and second low-side switch element 24 alternately turn ON and OFF in a predetermined switching cycle. The ON period of second high-side switch element 22 is controlled to be a period that is longer than or equal to minimum ON period Tm and that is until the peak value of motor current IL reaches target waveform value Vr/Rs. Each of the switch elements, for example, is maintained in the state shown in the state diagram (a) in FIG. 3B at times T0 to T2, and in the state shown in the state diagram (b) in FIG. 3B at times T2 to T3.

Next, the operation is described that is performed when the reference waveform is dynamically decaying, as in section B in FIG. 7B. Motor driver 110 controls motor current IL to cause it to follow the decay of the reference waveform signal. For this reason, the ON period of first high-side switch element 21 also decreases. However, since the ON period of first high-side switch element 21 does not become shorter than minimum ON period Tm, the peak value of motor current IL becomes greater than the control target value. Here, with reference to FIG. 9, the process is described in which the peak value of motor current IL that exceeds the control target value is corrected.

FIG. 9 is a graph showing an example of the waveforms of polarity indication signal DIR, reference pulse signal P0, comparison signal C3, output signal Q61 of D flip-flop 61, output signal Q63 of D flip-flop 63, drive signals V1 to V4, current detection voltage Vs, and motor current IL in section B in FIG. 7B. The state of each of the switch elements and the path of the flowing current are the same as those shown in the state diagram in FIG. 5.

At time t4 in FIG. 9, reference pulse signal P0 falls, with motor current IL exceeding control target value Vr/Rs. At this time, since motor current IL exceeds the control target value and comparison signal C3 is at a low level, D flip-flop 61 is reset and output signal Q61 falls. For this reason, drive signal V1 also falls, and first high-side switch element 21 enters the OFF state and first low-side switch element 23 enters the ON state. Also, in D flip-flop 63, reference pulse signal P0 is inputted as a clock signal at the trailing edge thereof, with a high level signal, which is the inverted signal of comparison signal C3, inputted to the D terminal. As such, D flip-flop 63 raises output signal Q63. When output signal Q63 reaches a high level, drive signal V2 rises via second switching circuit 59, and second high-side switch element 22 enters the ON state and second low-side switch element 24 enters the OFF state. For this reason, power source voltage Vcc is applied to motor 3 in the negative direction, and motor current IL starts decreasing. The state of each of the switch elements transits to the fast decay state, shown in the state diagram (b) in FIG. 5, in which the current supplied from input power source 1 and flowing through current detection resistor 4 flows backward to be a regenerative current. Also, when output signal Q63 of D flip-flop 63 reaches a high level, switch 43 enters the ON state, and comparison signal C3 is equivalently the result obtained by comparing current detection voltage Vs with negative reference waveform signal −Vr.

Output signal Q63 of D flip-flop 63 is inputted to the reset terminal of D flip-flop 63 via delay circuit 68 and NAND circuit 67. At time t5 after the delay time, the output of delay circuit 68 falls, but since motor current IL is still greater than or equal to the control target value and the inverted signal of comparison signal C3 is at a low level, the output of NAND circuit 67 remains at a high level, and the state of each of the switch elements is maintained, without D flip-flop 63 being reset.

At time t6, when current detection voltage Vs, which has been rising (absolute value decreases), reaches negative reference waveform signal −Vr, comparison signal C3 falls to a low level, and D flip-flop 63 is reset and output signal Q63 also falls. For this reason, drive signal V2 falls, second high-side switch element 22 enters the OFF state, and second low-side switch element 24 enters the ON state. As a result, the state transits to the slow decay state (the state diagram (c) in FIG. 5).

At time t7, when reference pulse signal P0 rises, drive signal V1 also rises via OR circuit 60 and first switching circuit 58, and first high-side switch element 21 enters the ON state. At the same time, drive signal V3 falls, and first low-side switch element 23 enters the OFF state, and motor current IL of motor 3, to which power source voltage Vcc is applied in the positive direction, starts increasing in the positive direction (the state diagram (a) in FIG. 5). In contrast to the previous cycle, motor current IL decays due to the fast decay state, and the level of current detection voltage Vs also drops.

However, the level of reference waveform signal Vr is also low, and so, when minimum ON period Tm is reached at time t8 and reference pulse signal P0 falls, motor current IL exceeds the control target value. For this reason, first high-side switch element 21 enters the OFF state, and the state transits to the fast decay state again (the state diagram (b) in FIG. 5). In this cycle, at time t9 in the fast decay state, motor current IL falls below the control target value (i.e., current detection voltage Vs exceeds reference waveform signal Vr), and comparison signal C3 falls. However, since the delayed signal of output signal Q63 of D flip-flop 63 has not arrived, the state remains the same.

At time t10, when the delayed signal of output signal Q63 of D flip-flop 63 rises, D flip-flop 63 is reset and output signal Q63 falls, and second high-side switch element 22 enters the OFF state. As a result, the state transits to the slow decay state. Stated differently, the delay time of output signal Q63 of D flip-flop 63 caused by delay circuit 68 serves as the minimum period in the fast decay state. Thereafter, such operation is repeated, and motor current IL converges to the target waveform.

Next, with reference to FIG. 10, the operation performed in section C in FIG. 7B is described. FIG. 10 is a graph showing an example of the waveforms of polarity indication signal DIR, reference pulse signal P0, comparison signal C3, output signal Q61 of D flip-flop 61, output signal Q63 of D flip-flop 63, drive signals V1 to V4, current detection voltage Vs, and motor current IL in section C in FIG. 7B.

Section C is a region in which the level of polarity indication signal DIR changes from high to low and motor current IL should be crossing zero, and in which reference waveform signal Vr is almost zero.

At time t11, when reference pulse signal P0 rises, drive signal V1 also rises, and first high-side switch element 21 enters the ON state. At the same time, drive signal V2 falls and first low-side switch element 23 enters the OFF state. Since reference waveform signal Vr is almost zero, comparison signal C3 reaches a low level.

At time t12, when minimum ON period Tm is reached and reference pulse signal P0 falls, D flip-flop 61 is reset and drive signal V1 also reaches a low level together with output signal Q61. As a result, first high-side switch element 21 enters the OFF state and first low-side switch element 23 enters the ON state. Meanwhile, in D flip-flop 63, reference pulse signal P0 is inputted as a clock signal at the trailing edge thereof, and D flip-flop 63 raises output signal Q63. As a result, drive signal V2 also reaches a high level, second high-side switch element 22 enters the ON state, and second low-side switch element 24 enters the OFF state. Since the state of each of the switch elements transits to the fast decay state, motor current IL decreases, current detection voltage Vs becomes negative, and comparison signal C3 reaches a high level. Also, when output signal Q63 of D flip-flop 63 reaches a high level, switch 43 enters the ON state, and comparison signal C3 is equivalently the result obtained by comparing current detection voltage Vs with negative reference voltage −Vr.

At time t13 after the delay time of delay circuit 68, when motor current IL and current detection voltage Vs reach zero, which is the control target value, comparison signal C3 reaches a low level, D flip-flop 63 is reset, and output signal Q63 reaches a low level. As a result, drive signal V2 also reaches a low level, second high-side switch element 22 enters the OFF state, and second low-side switch element 24 enters the ON state. The state of each of the switch elements transits to the slow decay state.

Note that time t13 is described as the time after the delay time of delay circuit 68, but there can be the case where motor current IL reaches zero first, after which the state of each of the switch elements transits to the slow decay state after the elapse of the delay time. In this case, motor current IL flows in the negative direction, but the current decays in the slow decay state. Although it depends on the properties and conditions of motor 3, the reverse voltage is assumed to be small in the vicinity of the zero-crossing point and the motor current in the slow decay state is also assumed to be zero or decay to be a small value.

In the slow decay state, no current flows through current detection resistor 4, and current detection voltage Vs is zero, which is the same as the control target value. As such, comparison signal C 3 is indeterminate. However, since no reference is made to comparison signal C3 in the slow decay state, the operation is not affected. To avoid such indeterminate state, hysteresis or offset may be set in current comparison circuit 57.

At time t14, when polarity indication signal DIR changes to a low level, the states of first switching circuit 58 and second switching circuit 59 are switched, and the output of OR circuit 60 becomes drive signal V2 and output signal Q63 of D flip-flop 63 becomes drive signal V1. After this, at time t15, when reference pulse signal P0 rises and is inputted to D flip-flop 61 as a clock signal, output signal Q61 rises, and drive signal V2 rises via OR circuit 60 and first switching circuit 58. Second high-side switch element 22 thus enters the ON state and second low-side switch element 24 enters the OFF state. Power source voltage Vcc is applied to motor 3 in the negative direction, and motor current IL starts increasing in the negative direction.

At time t16, second high-side switch element 22 enters the OFF state, first high-side switch element 21 enters the ON state, and the state transits to the fast decay state. At time t17, first high-side switch element 21 enters the OFF state, and the state transits to the slow decay state. As described above, the states of first switching circuit 58 and second switching circuit 59 are switched, resulting in a smooth reverse of the polarity of motor current IL.

As described above, in peak current control performed by motor driver 110 according to the present embodiment, in which motor current IL supplied from input power source 1 is detected and is caused to follow target waveform value Vr/Rs when in the positive direction and to follow target waveform value −Vr/Rs when in the negative direction, it is possible to maintain the target current waveform even in the vicinity of the zero-crossing point, by providing a period in which each of the switch elements is in the fast decay state until motor current IL decreases to the target current, when such motor current IL exceeds the target current during minimum ON period Tm.

Note that to simplify the control, fast decay may be used instead of slow decay also in normal operation. However, fast decay involves ripple increase in the motor current. An increase in ripple current leads to an increase in conduction losses and in switching frequency noise due to an increase in current effective value. In view of this, in the present disclosure, the fast decay state is provided only to correct the exceeding of the current target value in the minimum ON period.

Other Variations

The present disclosure has been described above on the basis of the embodiments, but the present disclosure is not limited to the foregoing embodiments.

For example, in each of the foregoing embodiments, high and low of the level of each signal may be inverted, and the circuit configuration may be changed in accordance with each signal.

The scope of the present disclosure also includes an embodiment achieved by making various modifications to each of the embodiments that can be conceived by those skilled in the art and an embodiment achieved by freely combining elements and functions in each of the embodiments and variations without departing from the essence of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The motor driver of the present disclosure is applicable, for example, to motors used for various purposes (e.g., on-vehicle motor) as a motor driver capable of driving a motor with low noise and low vibration.

The invention claimed is:

1. A motor driver that drives a motor, the motor driver comprising:

a first series switch circuit that includes a first high-side switch element and a first low-side switch element;

a second series switch circuit that includes a second high-side switch element and a second low-side switch element, and is connected in parallel to the first series switch circuit;

a reference pulse generation circuit that generates, in a predetermined cycle, a reference pulse signal whose pulse duration time is greater than zero;

a current detector that outputs a current signal corresponding to a motor current that is a current flowing through the motor;

a reference waveform generation circuit that generates a reference waveform signal corresponding to a control target value of the motor current;

a current comparison circuit that compares the current signal with the reference waveform signal to generate a comparison signal; and a pulse width modulation (PWM) circuit that outputs a first drive signal and a second drive signal in response to receiving the reference pulse signal, the reference waveform signal, and the comparison signal, wherein the motor is connected between a first connection point and a second connection point, the first connection point being a point connecting the first high-side switch element and the first low-side switch element, the second connection point being a point connecting the second high-side switch element and the second low-side switch element, the first drive signal includes a first pulse that starts synchronously with a start of the reference pulse signal and ends at a timing which is after the pulse duration time has elapsed from a beginning of the reference pulse signal and at which an absolute value of the current signal exceeds an absolute value of the reference waveform signal, the second drive signal includes a second pulse that starts after the first pulse ends and lasts at least during a period until the absolute value of the current signal falls below the absolute value of the reference waveform signal, when the absolute value of the current signal exceeds the absolute value of the reference waveform signal within the pulse duration time, and the PWM circuit:

outputs the first drive signal to the first series switch circuit and the second drive signal to the second series switch circuit in a first period during which the motor current flows mainly from the first connection point to the second connection point; and outputs the second drive signal to the first series switch circuit and the first drive signal to the second series switch circuit in a second period during which the motor current flows mainly from the second connection point to the first connection point.

2. The motor driver according to claim 1, wherein the reference waveform signal includes a first reference waveform signal that periodically oscillates to be positive and negative with a reference amplitude, and a second reference waveform signal that periodically oscillates to be positive and negative with the reference amplitude in antiphase with respect to the first reference waveform signal, the comparison signal includes a first comparison signal and a second comparison signal, the current comparison circuit includes a first comparison circuit that compares the current signal with the first reference waveform signal to generate the first comparison signal, and a second comparison circuit that compares the current signal with the second reference waveform signal to generate the second comparison signal, and the PWM circuit includes:

a first pulse output circuit that outputs a first reference pulse signal including a pulse outputted in the first period, in response to receiving the reference pulse signal;

a second pulse output circuit that outputs a second reference pulse signal including a pulse outputted in the second period, in response to receiving the reference pulse signal;

a first PWM circuit that outputs, to the first series switch circuit, the first drive signal in the first period and the second drive signal in the second period, based on the first comparison signal, the second comparison signal, the first reference pulse signal, and the second reference pulse signal; and a second PWM circuit that outputs, to the second series switch circuit, the second drive signal in the first period and the first drive signal in the second period, based on the first comparison signal, the second comparison signal, the first reference pulse signal, and the second reference pulse signal.

3. The motor driver according to claim 1, wherein the reference waveform generation circuit generates the reference waveform signal whose signal level is 0 or higher, the PWM circuit includes:

a first switching circuit that outputs the first drive signal to the first series switch circuit in the first period and to the second series switch circuit in the second period; and a second switching circuit that outputs the second drive signal to the second series switch circuit in the first period and to the first series switch circuit in the second period, and the current comparison circuit equivalently compares the current signal with a signal obtained by reversing a polarity of the reference waveform signal to negative, when the second drive signal turns ON the first high-side switch element or the second high-side switch element.

4. The motor driver according to claim 1, wherein the reference waveform generation circuit outputs, to the PWM circuit, a polarity indication signal that controls a direction of the motor current.

5. The motor driver according to claim 1, wherein the second drive signal includes no pulse when the absolute value of the current signal does not exceed the absolute value of the reference waveform signal during the pulse duration time from the start of the reference pulse signal.

* * * * *